Jan. 26, 1932.  C. A. OLSON  1,842,421
PISTON AND CONNECTING ROD ALIGNER
Filed May 11, 1931   2 Sheets-Sheet 2
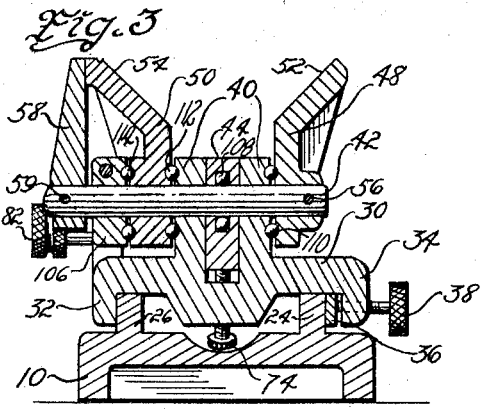
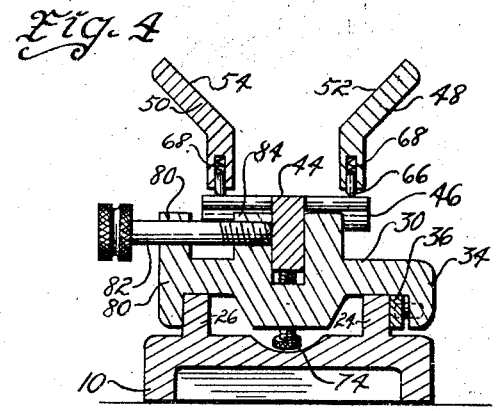
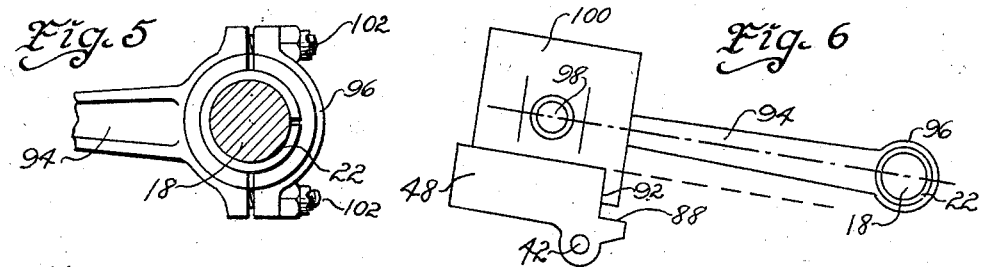
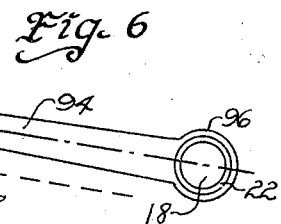
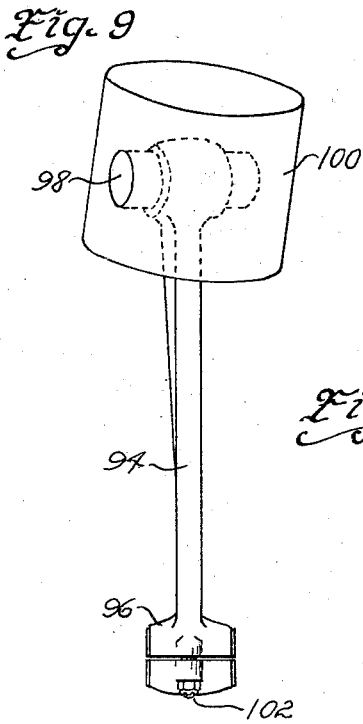
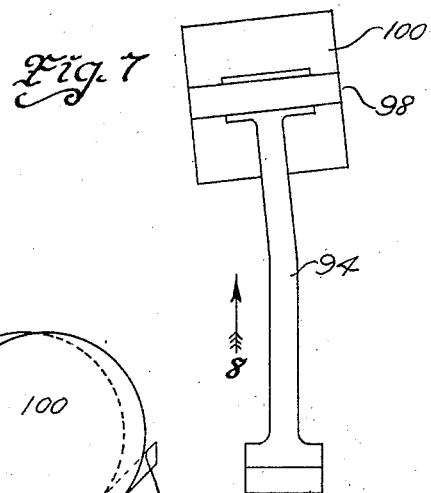
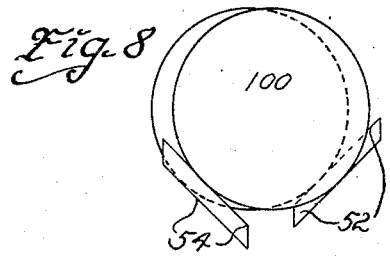
Inventor
Carl A. Olson
by Bair, Freeman & Sinclair
Attorneys
Witness
Ray W. Wilson Patented Jan. 26, 1932

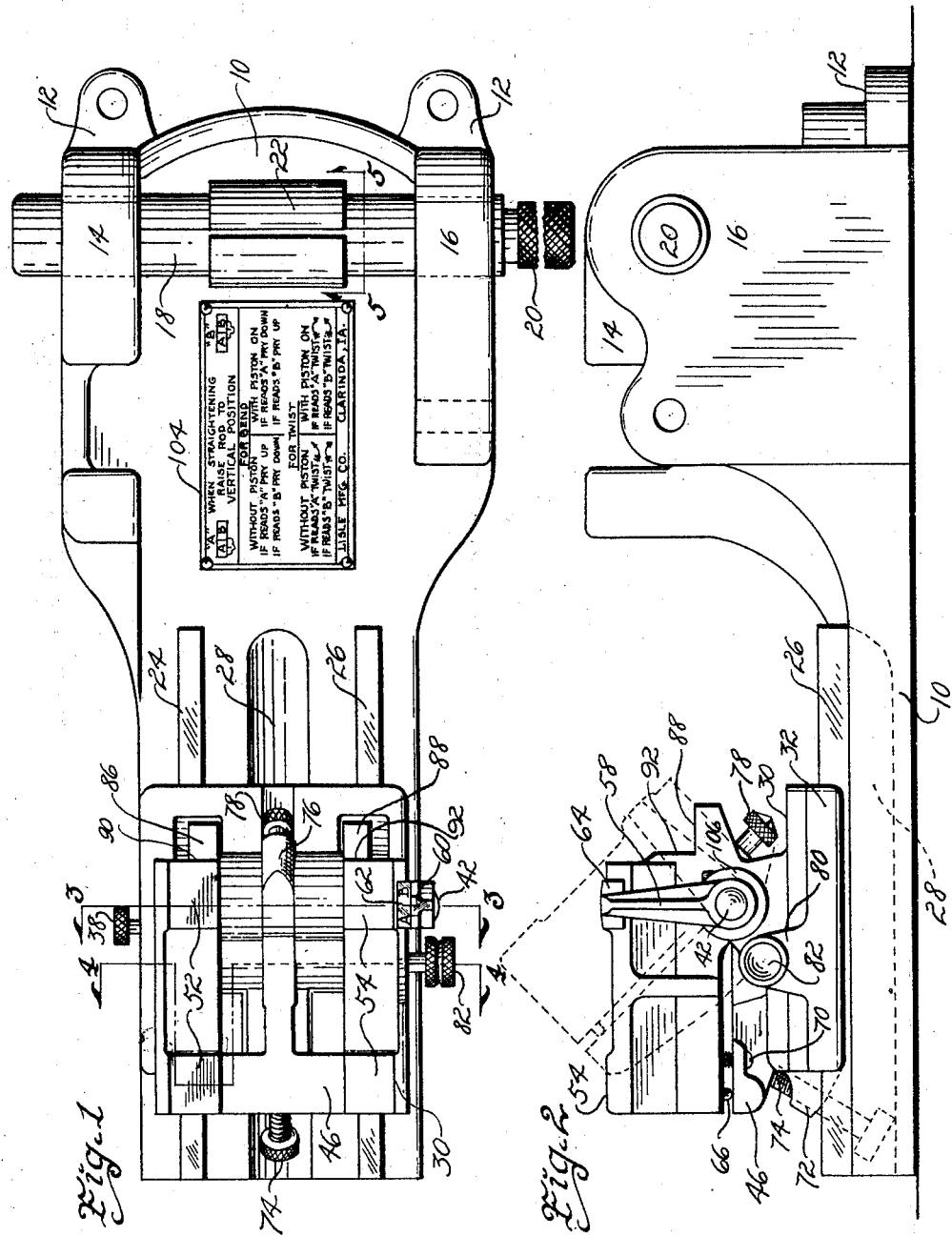

1,842,421

UNITED STATES PATENT OFFICE

CARL A. OLSON, OF CLARINDA, IOWA, ASSIGNOR, BY MESNE ASSIGNMENTS, TO LISLE CORPORATION, OF CLARINDA, IOWA, A CORPORATION OF IOWA

PISTON AND CONNECTING ROD ALIGNER

Application filed May 11, 1931. Serial No. 536,521.

The object of this invention is to provide an improved construction for an aligning device which is capable of being used for easily and quickly checking the accuracy of connecting rods or similar articles.

A further object of the invention is to provide an improved piston and connecting rod aligner which can be used for testing engine connecting rods, either with or without pistons, and for checking the accuracy of the rods both as to bend and as to twist, without the necessity of removing the rods from the device.

Still another object is to provide an improved piston and connecting rod aligner having means for testing connecting rods as to bend and twist, and also provided with means for adjusting and locking the testing members in suitable positions for quickly testing a plurality of connecting rods and pistons of the same size and character.

Another and further object of the invention is to provide an improved device of the class described including a pair of individually rockable testing members in the form of angular plates for engagement by a piston or by a wrist pin, together with indicating means for showing whether or not the parts so engaging the plates are accurate.

A further object of the invention is to provide an improved testing device of the class described in which a single indicating means may be employed for showing any and all inaccuracies of the members being tested.

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:—

Figure 1 is a plan view of a piston and connecting rod aligner involving my invention.

Figure 2 is a side elevation of the same in which the testing devices are shown by solid lines in position for testing a wrist pin or for testing a piston and connecting rod for bends of the rod and showing such parts by dotted lines in position for testing a piston and connecting rod for twists of the latter member.

Figure 3 is a cross section on the line 3—3 of Figure 1.

Figure 4 is a cross section on the line 4—4 of Figure 1.

Figure 5 is a cross section through the mandrel of the device on the line 5—5 of Figure 1, and showing a portion of a connecting rod associated therewith as required for testing purposes.

Figure 6 is a diagrammatic view showing a piston and connecting rod in position to be tested for bends.

Figure 7 is a diagrammatic view illustrating a piston and its connecting rod with an exaggerated showing of a bend in the rod.

Figure 8 is a diagrammatic view illustrating the position assumed by the piston and the testing plates when a bent rod is being tested.

Figure 9 is a diagrammatic view of a piston on a connecting rod which is twisted, and indicating the position which will be assumed by the piston when engaging the testing device in the position indicated by dotted lines in Figure 2.

In the drawings, the numeral 10 is employed to designate generally a base which may be secured to a bench or the like by means of apertured ears 12 formed thereon.

The base 10 is formed near one end with a pair of spaced standards 14 and 16 which are apertured in alignment to receive and support, in transverse position above the base, a mandrel 18. The mandrel 18 is formed at one end with a milled handle portion 20 and on its central portion is mounted a split sleeve 22.

A pair of spaced guideways or tracks 24 and 26 are formed on and extend longitudinally of the upper face of the base 10 and there is preferably a longitudinally extending groove 28 in the upper face of said base between said members.

A carriage 30 is accurately fitted to and is slidably mounted on the tracks 24 and 26. The carriage may consists primarily of a plate resting on the upper surfaces of the tracks and having at one side a downwardly extending flange 32 engaging the outer face of one of the tracks such as 26. At the opposite side the carriage is also formed with a downwardly extending flange 34 which is suitably spaced from the track 24 to permit the insertion of a locking bar 36 between them. The locking bar 36 is tapped to receive a threaded locking screw 38, which may be manipulated for engaging at its inner end the locking bar 36 and causing the latter member to frictionally engage the track 24. In this way the carriage may be locked in any desired position to which it may be adjusted on the tracks.

The carriage 30 is formed with a pair of laterally spaced upstanding ears 40 which are apertured in alignment to receive a rock shaft 42. A substantially T-shaped testing head has its stem portion 44 extending between the ears 40 and loosely engaging the rock shaft 42. The cross portion 46 of the testing head is located rearwardly of and parallel with the shaft 42 above the carriage 30.

A pair of angular testing plates are provided and are designated generally by the numerals 48 and 50 respectively. The testing plates are mounted on the shaft 42 on opposite sides of the ears 40. The testing plates extend in one direction a considerable distance from the shaft 42 and their free ends overlie the respective end portions of the cross member 46 of the testing head.

The testing plates 48 and 50, as before stated, are of angular formation, their upper portions being inclined outwardly from the median line of the device, and these inclined portions are formed each with a pair of spaced contact surfaces which project slightly above the general inclined surface of said members. The contact faces of the testing plates are formed at the respective ends of the plates and are inclined outwardly on an angle of approximately forty-five degrees. The contact faces of the testing plate 48 are designated by the numeral 52, while the contact faces of the testing plate 50 are designated by the numeral 54. The contact faces 52 and 54 are machined and suitably finished for contact with the piston in the testing operation.

The testing plates 48 and 50 are independently rockable or arranged for limited pivoted movement on the axis of the shaft 42. As here shown the plate 48 is secured to the shaft 42 by means of a pin 56, while the plate 50 is loosely mounted on said shaft.

An indicating finger 58 is fixed as by a pin 59 to the opposite end of the shaft 42 from the testing plate 48. The finger 58 projects upwardly to a position adjacent the outer margin of the inclined portion of the testing plate 50 and is formed on its upper end with an indicating means such as a transverse line 60 adapted to cooperate with a similar means such as a line 62 on the upper face of a dial 64 carried by said plate 50. The upper face of the dial 64 may also be provided with suitable indicia such as the letters A and B on opposite sides of the indicating line 62 for use as reference in giving instructions as to corrections which should be made to overcome inaccuracies revealed in the operation of the device.

The free ends of the angular testing plates 48 and 50 are yieldingly suported above and in slightly spaced relation to the face of the cross member 46 of the testing head. This yielding support is furnished by means of a pin 66 slidably mounted in a downwardly opening recess in the free end of each testing plate and backed by a coil spring 68 as shown in Figure 4. The free ends of the pins 66 engage the upper face of the cross member 46 and normally serve to support the two angular testing plates in uniformly spaced relation to said cross member, at the same time permitting independent movement of said plates toward the cross member when unequal pressure is applied. Movement of the testing plates away from the cross member 46 may be limited by any suitable means, such as suitable screws 70 carried by the lower edges of said plates and extending loosely through openings in the cross member, whereby the heads of said screws, by engagement with the member 46, serve to limit the independent movement of said plates in one direction.

In the outer end of the carriage 30 is formed a lug 72 having a tapped opening into which is threaded an adjusting screw 74. The screw 74 is arranged in inclined position and its upper end is adapted to engage the rear or outer end portion of the stem 44 of the testing head for the purpose of adjustably limiting downward movement of the free end portion of the testing assembly toward the carriage.

The opposite end portion of the stem 44, in front of the shaft 42, is formed with a threaded boss 76 into which an adjusting screw 78 is threaded. The head of the screw 78 is adapted to travel in the groove 28 and its point is adapted to engage the carriage 30 for adjustably limiting the tilting movement of the testing device forwardly or toward the mandrel 18.

At one side of the carriage 30 is formed an upstanding bearing 80 for a locking screw 82. The inner end portion of the locking screw 82 has a threaded engagement with a boss or lug 84 on the carriage and the inner end of said screw is adapted for engagement with one face of the stem 44 of the testing head, whereby the testing assembly may be set and locked in any desired position of angular adjustment about the axis of the shaft 42.

At the forward or inner end portions of the testing plates 48 and 50 are formed respectively a pair of substantially horizontal testing faces 86 and 88 and a pair of substantially vertical testing faces 90 and 92, the testing faces of each plate being adjacent and at right angles to each other.

The device is used for testing inaccuracies such as bends or twists of objects such as pistons or piston assemblies for internal combution engines. In this connection there is illustrated a connecting rod 94 having at one end a bearing 96 and carrying at the opposite end a wrist pin 98 on which a piston 100 is pivotally mounted.

By using this aligner or testing device, a connecting rod 94 can be tested either with or without the piston 100 mounted on the wrist pin.

In either event the mandrel is moved longitudinally to such extent that it is withdrawn from its support in one of the standards such as 14 and is then inserted through the bearing 96 of a connecting rod and is moved back into place. The bearing 96 is caused to engage the split sleeve 22 on the mandrel and is then drawn up tightly thereon by use of the bearing bolts 102.

For use of the device in testing a connecting rod without a piston thereon the carriage 30 is moved on the tracks 24 and 26 so that the projecting ends of the wrist pin 98 of the connecting rod may engage the horizontal testing surfaces 86 and 88 of the testing assembly. Then the carriage is moved back toward the mandrel 18 until the vertical surfaces 90 and 92 are in position for engagement with the wrist pin and sufficient pressure is applied manually to cause the wrist pin to engage with all four of such surfaces.

It will be apparent that any deflection of the wrist pin 98 from its true position at right angles to the connecting rod 94 and parallel with the axis of the connecting rod bearing, will cause an independent rocking movement of one or the other of said plates when such pressure is applied. For instance, any deflection or inaccuracies of position of the wrist pin caused by a twist in the connecting rod will cause an unequal pressure on one or the other of the horizontal surfaces 86 or 88, thereby causing the corresponding testing plate 48 or 50 to rock slightly relative to the other, and this independent rocking movement is indicated by separation of the coacting indicating lines 60 and 62. In this connection it will be understood that in the normal position of the parts the lines 60 and 62 are in absolute alignment and that because of the considerable length of the finger 58, a slight inaccuracy of the part being tested will result in a very noticeable separation of these indicating lines. If there is an excess of pressure of the wrist pin on the surface 86 it will obviously cause the testing plate 48 to be rocked upwardly or toward the mandrel 18, thus causing the indicating finger 58 to be moved in the same direction whereby its indicating line 60 will travel to the "B" side of the line 62. If there is an excess of pressure on the surface 88, it will obviously cause the testing plate 50 to be rocked in a similar direction whereby the line 62 on its dial will move out of alignment with the line 60 so that the latter line points to the "A" side.

In this manner it may be determined what correction should be made on the connecting rod for overcoming the twist thus revealed.

The tests for bends in the connecting rod are made in a similar manner by noticing any deflections which occur because of unequal pressure when the vertical faces 90 and 82 are caused to contact with the wrist pin. I consider that it is desirable to provide a convenient and accurate means for instructing the operator as to what steps should be taken for correcting the inaccuracies thus determined and for that purpose I mount a plate 104 directly on the upper face of the base 10, giving specific directions as to procedure to correct various inaccuracies indicated by the "A" and "B" deflections of the indicating means.

For testing a complete piston assembly in which a piston such as 100 is mounted on the wrist pin, the carriage 30 is first moved on its tracks to such position that the piston will engage in the substantially V-shaped space between the inclined faces of the testing plates 48 and 50.

When it is desired to test the assembly for bends in the connecting rod, the testing assembly is placed at such position of inclination that the piston will rest on the inclined surfaces of the plates with its axis substantially identical with the axis of the connecting rod. This position of the parts is shown diagrammatically in Figure 6 and it is accomplished by manually turning the adjustable stop screw 74 in its seat, either for tiltably raising the rear end of the testing assembly or by permitting it to lower through action of gravity.

Then the piston is forced manually into engagement with all four of the contact surfaces 52 and 54. Now, if the piston and connecting rod are true and accurate, this pressure on the contact surface will be uniform, but if there should be any bend in the connecting rod in a direction substantially parallel to the axis of the bearing 96 as indicated in Figure 7, it will cause an unequal pressure on the contact surfaces of one of the testing plates. If there is an excess of pressure for instance on the contact surfaces 54 of the plate 50, as indicated diagrammatically in Figure 8, it will cause the coacting indicating lines 60 and 62 to indicate a "B" deflection, and if there is an excess of pressure on the contact faces 52 of the plate 48, there will be indicated an "A" deflection. From the direction plate 104 the workman will then be informed as to what procedure to follow in correcting the inaccuracies thus indicated.

In this connection it should be stated that the connecting rod is placed in such position that it is in line with the center of the testing assembly and this is accomplished, after the piston assembly has been connected to the mandrel 18, by shifting the mandrel longitudinally in its supports.

In the event it is desired to test a number of piston assemblies of the same size and character for bends in their connecting rods, it is desirable to make sure that the testing assembly will remain in the same position for all of such tests. For that purpose I provide the locking screw 82 which may be tightened up against the member 44, thereby securely holding the testing assembly in the adjusted position of inclination.

When it is desired to test a piston assembly for twists in the connecting rod such as are indicated in Figure 8, the testing assembly is moved to a more forwardly or upwardly inclined position as indicated by dotted lines in Figure 2. This results in throwing the piston 100 into a position of considerable angularity relative to the connecting rod as also indicated in Figure 9.

With the parts in this position the piston is caused to forcibly engage all of the four contact faces 52 and 54. If there is no twist in the connecting rod there will still be a uniform pressure of the piston on all of the contact surfaces. If, however, the connecting rod is twisted, it will throw one side of the piston laterally so that unequal pressure will be exerted on the contact faces of the plates and will be indicated by either A or B deflection of the indicating means 60 and 62, and from the instruction plate 104 the workman may know how to correct the inaccuracies.

The testing assembly may also be set in its extreme upwardly inclined position by means of the locking screw 82 and in addition, the adjusting screw 78 may be manipulated in its threaded seat so as to limit and indicate the extent to which such inclination is to be made for testing a plurality of piston assemblies.

By using the separate and individually rockable angular plates I make it possible to test a piston assembly both for bends and for twists without removing the assembly from its support. This is a considerable advantage in the saving of time and work and also in procuring accurate and uniform results in a series of tests. Uniformity of results in a series of tests is also procured by the adjustable means, stop screws and the locking means for quickly changing the testing assembly from "twist" to "bend" position.

In the embodiment which has been illustrated and described in this application, provision is made whereby all errors, either with the piston on or off, are indicated by a single indicating means, but it is obvious that this arrangement may be altered considerably without departing from my invention and I do not desire to be restricted to the particular means herein shown and described. It is also obvious that a different construction of indicating means may be employed instead of the finger and dial with their cooperating indicating marks.

A set collar 106 is adjustably mounted on the rock shaft 42 between the hub of the testing plate 50 and the indicating finger 58 for the purpose of preventing longitudinal play of the various members on said shaft.

If desired, anti-friction bearings may be provided for the stem of the testing head 44 and for the angular testing plates 48 and 50. For instance, bearing balls 108 may be mounted in a suitable raceway in the member 44 for engagement with the shaft 42. A row of balls 110 may be mounted between the inner face of the member 48 and the outer face of the adjacent ear 40. Similarly a row of balls 112 may be mounted between the member 50 and the adjacent ear 40, and another row 114 between the other face of said member 50 and the adjacent face of the set collar 106. This makes the tool more sensitive and hence more dependable for detecting inaccuracies of alignment.

I claim as my invention:—

1. A device of the character described comprising a base, a mandrel support carried by said base, a pair of testing plates having oppositely inclined contact surfaces, and means for mounting said plates on said base so that they are independently rockable on a common horizontal axis.

2. A device of the character described comprising a base, a mandrel support carried by said base, a pair of testing plates having oppositely inclined contact surfaces, means for mounting said plates on said base so that they are independently rockable on a common horizontal axis, and coacting indicating means for showing relative movement of said plates.

3. A device of the character described comprising a base, a mandrel support carried by said base, a pair of testing plates having oppositely inclined contact surfaces, means for mounting said plates on said base so that they are independently rockable on a common horizontal axis, and means for conjunctively supporting said testing plates at different degrees of inclination to the base.

4. A device of the character described comprising a base, a mandrel support thereon, a testing head pivotally mounted for adjustment on a transverse axis, a pair of laterally spaced testing plates movable with said testing head and each having outwardly inclined contact surfaces, and testing plates being yieldingly supported for limited independent pivotal movement.

5. A device of the character described comprising a base, a mandrel support thereon, a testing head pivotally mounted for adjustment on a transverse axis, adjustable stop means for limiting oscillation of said head, a pair of laterally spaced testing plates movable with said testing head and each having outwardly inclined contact surfaces, said testing plates being yieldingly supported for limited independent pivotal movement.

6. A device of the character described comprising a base, a mandrel support thereon, a testing head pivotally mounted for adjustment on a transverse axis, means for locking said head in any selected position of adjustment, a pair of laterally spaced testing plates movable with said testing head and each having outwardly inclined contact surfaces, said testing plates being yieldingly supported for limited independent pivotal movement.

7. A device of the character described comprising a base, a mandrel support thereon, a carriage slidably mounted on said base, a testing head tiltably mounted on said carriage, a pair of laterally spaced testing plates movable with said testing head and also arranged for limited movement on a horizontal axis independently relative to said head and relative to each other, said plates being formed with horizontal surfaces and vertical surfaces for engagement by the wrist pin of a connecting rod and also being formed with inclined surfaces for engagement by a piston on a connecting rod.

8. A device of the character described comprising a base, a mandrel support thereon, a carriage slidably mounted on said base, a testing head tiltably mounted on said carriage, a pair of laterally spaced testing plates movable with testing head and also arranged for limited movement on a horizontal axis independently relative to said head and relative to each other, said plates being formed with oppositely inclined surfaces for engaging a piston, and means for supporting said testing head and plates at different degrees of inclination whereby a piston assembly may be tested in different relative positions.

9. A device of the character described comprising a base, a mandrel support thereon, a carriage slidably mounted on said base, a testing head tiltably mounted on said carriage, a pair of laterally spaced testing plates movable with said testing head and also arranged for limited movement on a horizontal axis independently relative to said head and relative to each other, said plates being formed with oppositely inclined surfaces for engaging a piston, means for supporting said testing head and plates at different degrees of inclination whereby a piston assembly may be tested in different relative positions, and coacting indicating means connected with the respective plates for indicating relative independent movement thereof in a testing operation.

10. In a device of the class described, a base having a pair of spaced aligned journals, a carriage mounted on said base for movement toward and away from said journals, a pair of independently rockable testing plates carried by said carriage, said plates having spaced upright surfaces normally in the same plane and parallel with the axis of said journals and also having other spaced surfaces at right angles to the upright surfaces and also parallel with the journal axis.

11. In a device of the class described, a base having a pair of spaced aligned journals, a carriage mounted on said base for movement toward and away from said journals, a pair of independently rockable testing plates carried by said carriage, said plates having spaced upright surfaces normally in the same plane and parallel with the axis of said journals and also having other spaced surfaces at right angles to the upright surfaces and also parallel with the journal axis, and yielding means for holding said plates in their normal positions in which their respective upright and other surfaces are in the same planes.

12. In a device of the class described, a base having a pair of spaced aligned journals, a carriage mounted on said base for movement toward and away from said journals, a pair of independently rockable testing plates carried by said carriage, said plates having spaced upright surfaces normally in the same plane and parallel with the axis of said journals and also having other spaced surfaces at right angles to the upright surfaces and also parallel with the journal axis, and coacting means connected with said plates for indicating relative movement from their normal positions.

13. A device of the class described comprising a base, a pair of spaced journals thereon, a carriage on said base movable toward and away from said journals, a shaft on said carriage parallel with the axis of said journals, a testing head arranged for oscillation on said shaft, a pair of spaced testing plates arranged for oscillation on said shaft and each provided with testing surfaces, and means for yieldably supporting said plates from said testing head and for permitting independent movement of said plates relative to said head and to each other.

14. A device of the class described comprising a base, a pair of spaced journals thereon, a carriage on said base movable toward and away from said journals, a shaft on said carriage parallel with the axis of said journals, a testing head arranged for oscillation on said shaft, a pair of spaced testing plates arranged for oscillation on said shaft and each provided with testing surfaces, means for yieldably supporting said plates from said testing head and for permitting independent movement of said plates relative to said head and to each other, and means connected with said plates for indicating their relative movement.

15. A device constructed according to claim 13 and having adjustable means for limiting oscillatory movement of said testing head in a direction away from said journals.

16. A device constructed according to claim 13 and having adjustable means for limiting oscillatory movement of said testing head in a direction toward said journals.

17. A device constructed according to claim 13 and having locking means for holding said testing head in any selected position of oscillatory adjustment on said shaft.

18. A device constructed according to claim 14, in which said testing plates are formed with contact surfaces sloping away from each other and capable of receiving a piston between them, whereby an inaccuracy of the assembly being tested will result in unequal pressure on said plates and cause relative movement thereof.

19. A device constructed according to claim 13, in which the testing plates are formed with contact surfaces sloping away from each other and adapted to receive a piston between them, said plates also being formed with upright testing surfaces parallel with the axis of said journals and normally in alignment with each other, and also with other testing surfaces at right angles to said upright surfaces.

20. A device of the class described comprising a base, a pair of spaced journals thereon, a carriage on said base movable toward and away from said journals, a shaft on said carriage parallel with the axis of said journals, a testing head arranged for oscillation on said shaft, a pair of spaced testing plates arranged for oscillation on said shaft and each provided with testing surfaces, one of said testing plates being fixed to said shaft and the other being loose thereon, a finger fixed to said shaft and extending adjacent to a portion of said loose plate, and coacting indicating means on said finger and on said portion of the loose plate, for indicating relative movement of the respective plates.

Des Moines, Iowa, March 14, 1931.

CARL A. OLSON.